US012586350B2

(12) United States Patent
Jenni et al.

(10) Patent No.: US 12,586,350 B2
(45) Date of Patent: Mar. 24, 2026

(54) DETERMINING AUDIO AND VIDEO REPRESENTATIONS USING SELF-SUPERVISED LEARNING

(71) Applicant: Adobe Inc., San Jose, CA (US)

(72) Inventors: Simon Jenni, Hagendorf (CH); John Collomosse, Woking (GB)

(73) Assignee: Adobe Inc., San Jose, CA (US)

( * ) Notice: Subject to any disclaimer, the term of this patent is extended or adjusted under 35 U.S.C. 154(b) by 448 days.

(21) Appl. No.: 18/162,544

(22) Filed: Jan. 31, 2023

(65) Prior Publication Data

US 2024/0257496 A1     Aug. 1, 2024

(51) Int. Cl.
*G06V 10/764*     (2022.01)

(52) U.S. Cl.
CPC .................................. *G06V 10/764* (2022.01)

(58) Field of Classification Search
CPC ...... G06V 10/764; G06V 10/82; G06V 20/46; G06N 3/045
See application file for complete search history.

(56) References Cited

U.S. PATENT DOCUMENTS

| | | | | |
|---|---|---|---|---|
| 12,266,350 | B1 * | 4/2025 | Ganju ...................... | G10L 15/16 |
| 2016/0071024 | A1 * | 3/2016 | Amer ....................... | G06F 18/29 |
| | | | | 706/12 |
| 2020/0143289 | A1 * | 5/2020 | Kyaw .................... | G06N 20/00 |
| 2021/0125617 | A1 * | 4/2021 | Park ....................... | G06F 16/683 |
| 2022/0318349 | A1 * | 10/2022 | Wasnik .................. | G06V 10/82 |
| 2024/0104352 | A1 * | 3/2024 | Zhang .................. | G06N 3/0895 |

OTHER PUBLICATIONS

Jenni, S., et al., "Video Representation Learning by Recognizing Temporal Transformations", arXiv:2007.10730v1, Jul. 21, 2020, pp. 1-19.
Korbar, B., et al., "Cooperative Learning of Audio and Video Models from Self-Supervised Synchronization", arXiv:1807. 00230v2, Nov. 9, 2018, pp. 1-14.
Misra, I., et al., "Shuffle and Learn: Unsupervised Learning using Temporal Order Verification", arXiv:1603.08561v2, Jul. 26, 2016, pp. 1-21.
Morgado, P., et al., "Audio-Visual Instance Discrimination with Cross-Modal Agreement", CVPR, 2021, pp. 12475-12486.
Recasens, A., et al., "Broaden Your Views for Self-Supervised Video Learning", arXiv:2103.16559v3, Oct. 19, 2021, pp. 1-15.
Wei, D., et al., "Learning and Using the Arrow of Time", CVPR, 2018, pp. 8052-8060.

* cited by examiner

*Primary Examiner* — Shaghayegh Azima
(74) *Attorney, Agent, or Firm* — Nicholson De Vos Webster & Elliott LLP

(57)     ABSTRACT

Embodiments are disclosed for training a system to generate audio and video representations using self-supervised learning. The method may include receiving a video signal including an audio component and a video component. A first machine learning model is trained to determine a representation of the audio component using a contrastive learning task and a temporal learning task. A second machine learning model to determine a representation of the video component using the contrastive learning task and the temporal learning task. By training the machine learning models using both contrastive learning tasks and temporal learning tasks, the machine learning models learn short term features, long term features, and semantic features of input data.

20 Claims, 10 Drawing Sheets

800

RECEIVING A VIDEO SIGNAL INCLUDING AN AUDIO COMPONENT AND A VIDEO COMPONENT 802

TRAINING A FIRST MACHINE LEARNING MODEL TO DETERMINE A REPRESENTATION OF THE AUDIO COMPONENT USING A CONTRASTIVE LEARNING TASK AND A TEMPORAL LEARNING TASK 804

TRAINING A SECOND MACHINE LEARNING MODEL TO DETERMINE A REPRESENTATION OF THE VIDEO COMPONENT USING THE CONTRASTIVE LEARNING TASK AND THE TEMPORAL LEARNING TASK 806

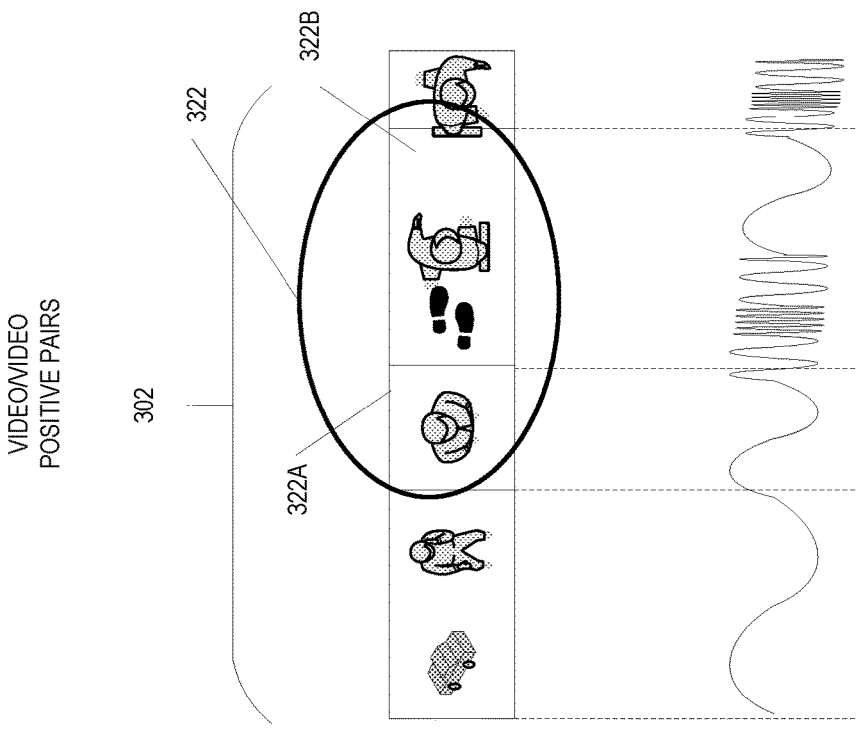
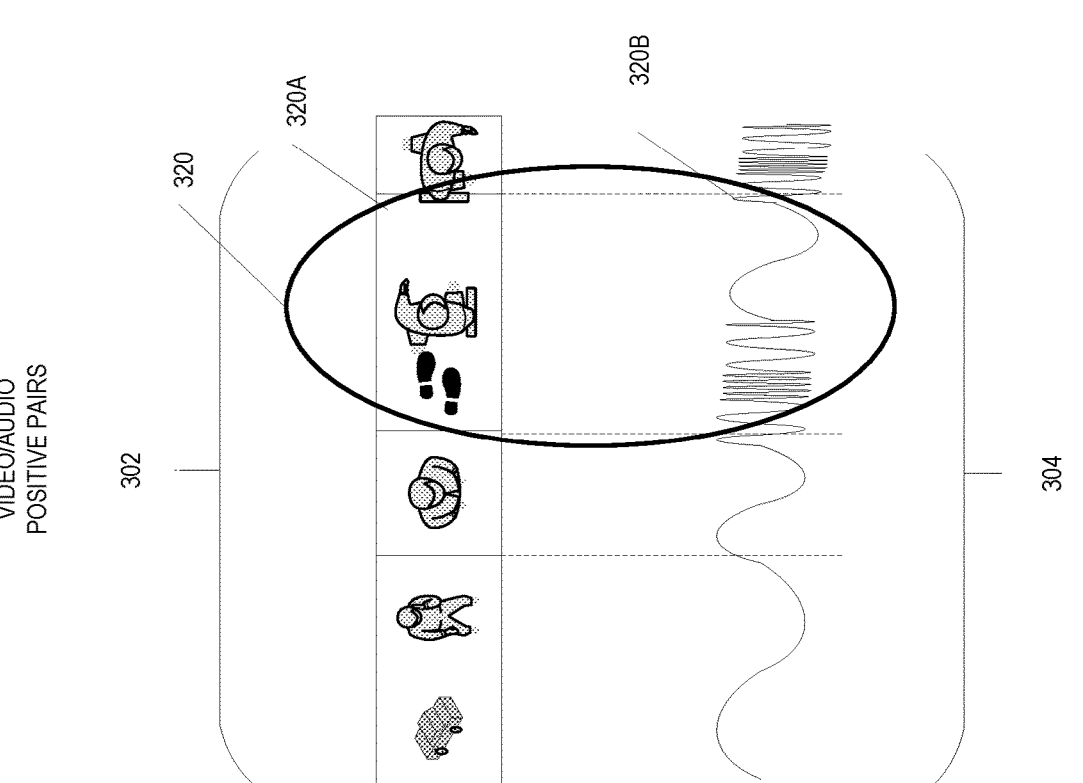
FIG. 3

VIDEO/VIDEO DOMAIN
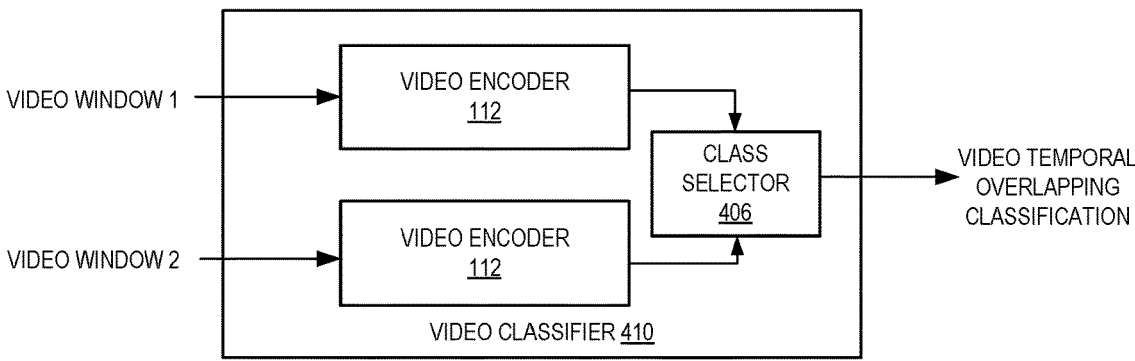
AUDIO/AUDIO DOMAIN
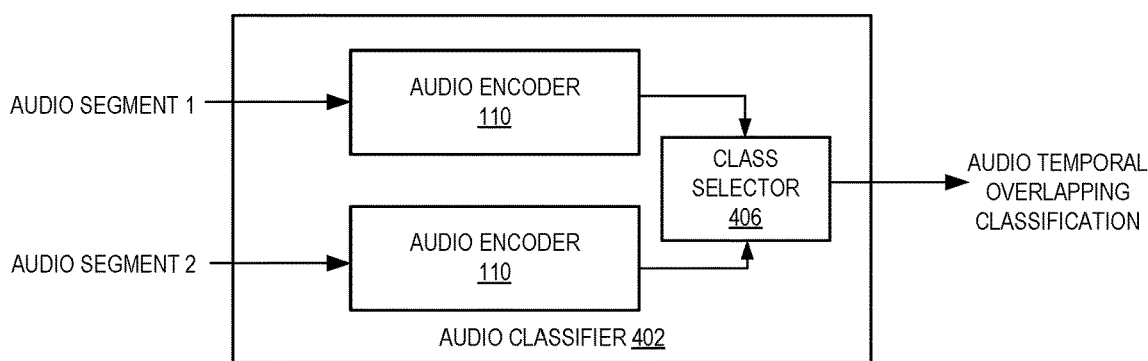
*FIG. 4A*

VIDEO/AUDIO DOMAIN
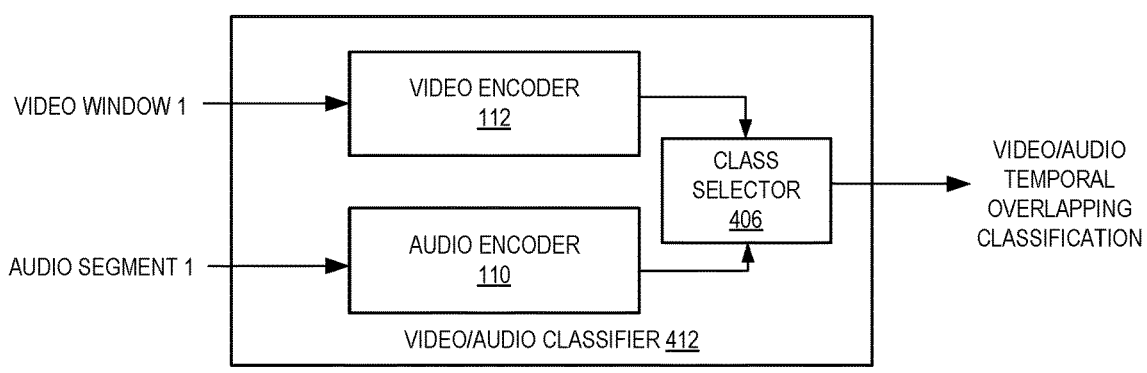
AUDIO/VIDEO DOMAIN
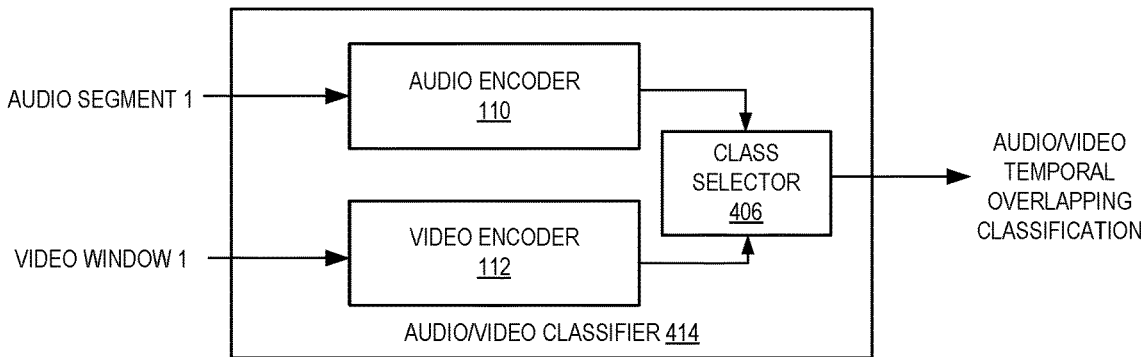
*FIG. 4B*

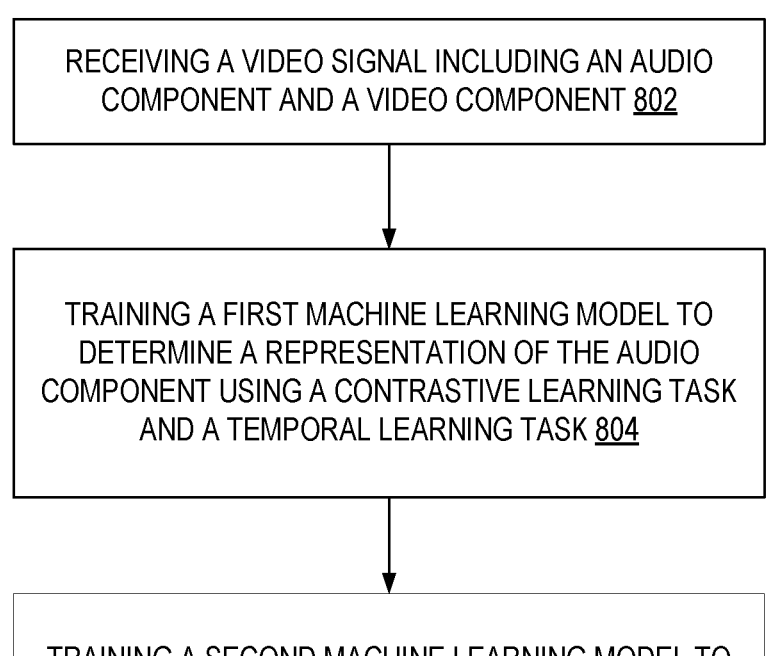

800

RECEIVING A VIDEO SIGNAL INCLUDING AN AUDIO COMPONENT AND A VIDEO COMPONENT 802

TRAINING A FIRST MACHINE LEARNING MODEL TO DETERMINE A REPRESENTATION OF THE AUDIO COMPONENT USING A CONTRASTIVE LEARNING TASK AND A TEMPORAL LEARNING TASK 804

TRAINING A SECOND MACHINE LEARNING MODEL TO DETERMINE A REPRESENTATION OF THE VIDEO COMPONENT USING THE CONTRASTIVE LEARNING TASK AND THE TEMPORAL LEARNING TASK 806

FIG. 8

DETERMINING AUDIO AND VIDEO REPRESENTATIONS USING SELF-SUPERVISED LEARNING

BACKGROUND

Machine learning is a sub-area of artificial intelligence in which a machine learning model is trained to perform one or more specific tasks. For instance, a machine learning model can be trained to perform a target task by relying on patterns and inferences learned from training data, without requiring explicit instructions to perform the task. Some machine learning models can use the learned patterns and inferences to transform an input into a representation. The representation is an encoded representation of the input data used in downstream processing. Downstream processing tasks that may use the representation include including video processing tasks (including video retrieval tasks, action recognition tasks, classifying frames of a video, tagging video frames, searching video frames for objects, video fingerprinting, etc.), audio processing tasks (including audio retrieval tasks, action recognition tasks, classifying audio data, tagging audio data, searching audio data for words/speakers, audio fingerprinting, etc.), and the like. The accuracy of such downstream tasks is dependent on the ability of the machine learning model learning the patterns and inferences from training data and creating the representation of the input.

SUMMARY

Introduced here are techniques/technologies that train a system to generate representations of video data. Specifically, an audio encoder is trained to learn audio components of video data, and a video encoder is trained to learn visual components of the video data. The system is trained using a combination of contrastive learning with temporal pretext tasks. Specifically, temporal pretext tasks are applied to the audio modality, the video modality, and the video/audio modality. For example, each encoder of the system is trained to perform unitary intra-modal tasks such as classifying a playback speed and classifying a playback direction. Moreover, each encoder of the system is trained to perform pairwise intra and inter modal tasks such as temporal clip ordering.

Additionally, contrastive learning is applied to the video modality, and the video/audio modality. Positive and negative pairs for contrastive learning are determined using an evolving feature space. Specifically, prior feature vectors determined from the system are used to create sample-dependent positive and negative pairs. Training the system includes the expanded set of positive and negative pairs.

The loss determined from training the temporal pretext tasks is combined with the loss from training the contrastive tasks resulting in a total self-supervised learning loss. The total self-supervised learning loss is optimized over time, resulting in the generation of robust audio and video features extracted from audio components and video components of video data respectively.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 3 illustrates an example of positive pairs determined by the training module for use as training data in the contrastive learning training system, in accordance with one or more embodiments;

FIGS. 4A-4B illustrate a Siamese network used in classifying temporal clip ordering, in accordance with one or more embodiments;

FIG. 8 illustrates a flowchart of a series of acts in a method of generating audio and video representations using self-supervised learning, in accordance with one or more embodiments.

DETAILED DESCRIPTION

One or more embodiments of the present disclosure include a training manager for the training of a system to learn to generate representations of video data. Video data includes both audio components and visual components to capture a scene. Specifically, a segment of video data includes temporal scene dynamics (e.g., object motion) and audio of the scene. Accordingly, video data includes a visual dimension, a temporal dimension, and an audio dimension.

In one conventional approach, training systems use only image data to train a system to generate a representation of video data. For example, conventional approaches train a system using intra-modal contrastive learning in the image domain. Other conventional approaches train a system to generate a representation of video data using intra-modal pretext classification tasks. However, as described, video data includes both audio and visual components. As a result, the conventional approaches are limited in the robustness of the determined representations of video data by excluding additional dimensions such as the audio dimension and the temporal dimension.

To address these and other deficiencies in conventional systems, the training manager of the present disclosure trains a video encoder and an audio encoder to learn representations of video data. The training manager of the present disclosure is used to train a representation system including the video encoder and the audio encoder using image components, audio components, and temporal dynamics of video data.

Specifically, the training manager captures short-term features of the video data by training the representation system using temporal pretext classification tasks such as classifying a playback speed and classifying a playback direction. Such temporal pretext classification tasks are unitary tasks as a single video window and audio segment are classified by the video encoder and the audio encoder respectively. The training manager captures longer-term features of video data by training the representation system using learning tasks at the video level such as clip ordering tasks. Such learning tasks are pairwise temporal pretext classification tasks as two inputs are classified by the video encoder and audio encoder of the representation system respectively.

Additionally, the training manager captures the relationship between the video data, audio data, and temporal dynamics, by training the representation system using contrastive learning. By training the audio encoder and video encoder on positive and negative pairs determined from the two modalities (e.g., audio and video) and on the direction of prediction (e.g., predicting a video representation from audio samples, predicting an audio representation from video samples, and predicting a video representation from video samples), the representation system is able to learn rich semantic information of the video data.

Figure 1:
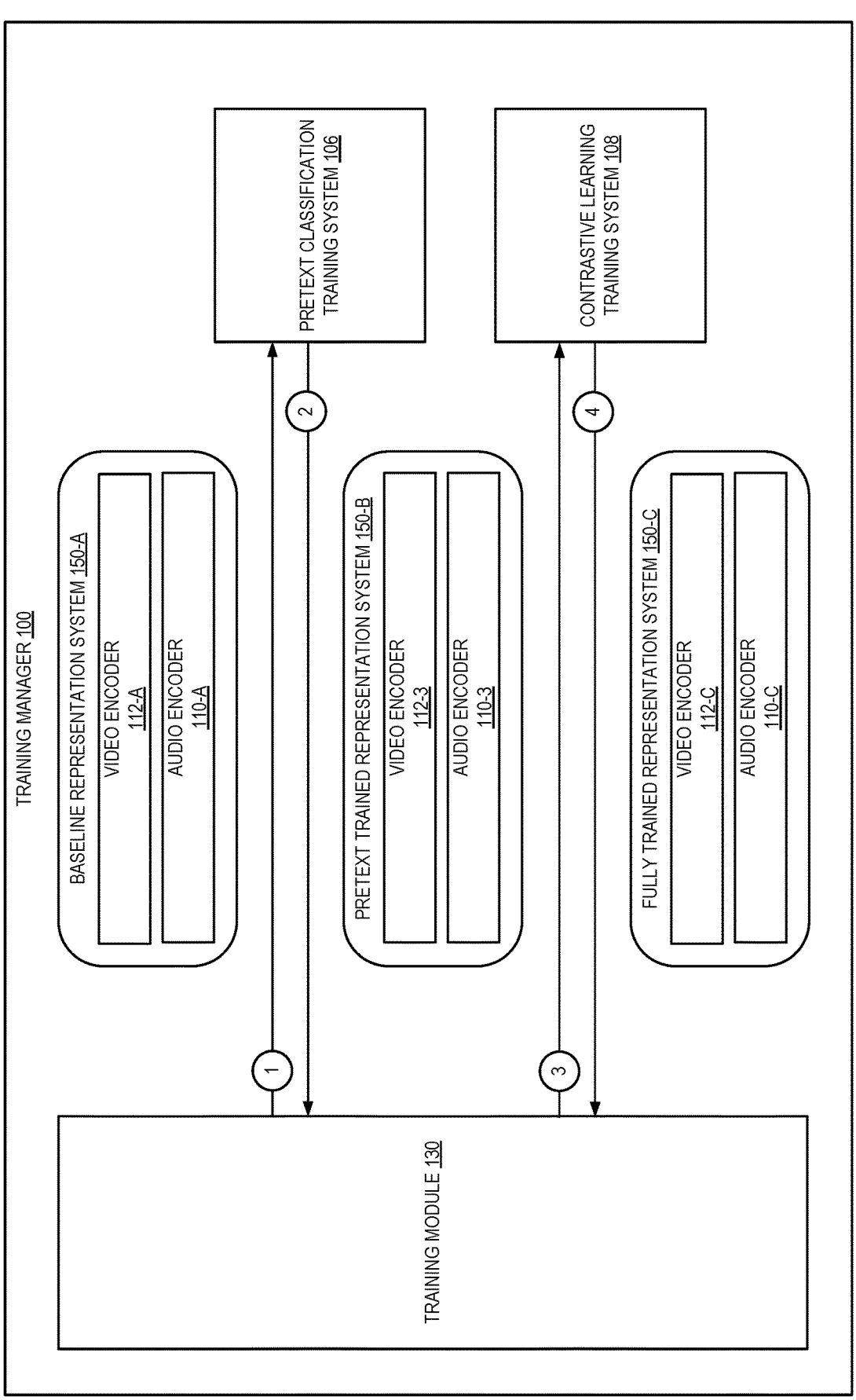
FIG. 1 illustrates a diagram of a process of training a representation system including an audio encoder and a video encoder, in accordance with one or more embodiments.

FIG. 1 illustrates a diagram of a process of training a representation system including an audio encoder and a video encoder, in accordance with one or more embodiments. As shown in FIG. 1, embodiments include a training manager 100. The training manager 100 includes a pretext classification training system 106, a contrastive learning training system 108, and a training module 130. The training manager 100 employs the pretext classification training system 106, contrastive learning training system 108, and training module 130 to train a representation system 150 including a video encoder 112 and an audio encoder 110. The representation system 150 is illustrated as being trained in various stages including a baseline representation system 150-A, a pretext trained representation system 150-B, and a fully trained representation system 150-C.

For ease of description, the present disclosure describes training manager 100 the pretext classification training system 106 training the representation system 150 first, and subsequently the contrastive learning training system 108 training the representation system 150. However, it should be appreciated that the contrastive learning training system 108 may train the representation system 150 first, and subsequently the pretext classification training system 106 may train the representation system 150. Additionally or alternatively, the pretext classification training system 106 and the contrastive learning training system 108 may simultaneously train the representation system 150 (e.g., train the representation system 150 in parallel).

At numeral 1, the training module 130 passes a baseline representation system 150-A to the pretext classification training system 106. The baseline representation system 150-A includes baseline video encoder 112-A and baseline audio encoder 110-A. Additionally, the training module 130 passes training data used by the pretext classification training system 106 to train the baseline representation system 150-A. As described herein, the training data used to train the baseline representation system 150-A includes temporally manipulated video and audio signals and clips (e.g., one or more video windows or audio segments of a video or audio signal respectively).

While an encoder is described herein, it should be appreciated that any neural network or machine learning model may be trained using the training module 130. A neural network is a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In some embodiments, the baseline video encoder 112-A and baseline audio encoder 110-A may be a video encoder and an audio encoder that have not been pretrained. In other embodiments, baseline video encoder 112-A and baseline audio encoder 110-A are off-the-shelf models that have been pretrained using general datasets.

The pretext classification training system 106 trains the baseline representation system 150-A (including baseline video encoder 112-A and baseline audio encoder 110-A) using training data received by the training module 130 as described herein. Specifically, FIGS. 2-5 describe training the representation system 150 to perform temporal pretext tasks using the pretext classification training system 106. As a result of the training performed by the pretext classification training system 106, the pretext classification training system 106 fine-tunes the baseline representation system 150-A. The fine-tuned baseline video encoder 112-A and baseline audio encoder 110-A (as part of the baseline representation system 150-A) become pretext trained video encoder 112-B and pretext trained audio encoder 110-B (as part of the pretext trained representation system 150-B).

At numeral 2, the pretext classification training system 106 passes the pretext trained representation system 150-B (including the pretext trained video encoder 112-B and pretext trained audio encoder 110-B) back to the training module 130.

At numeral 3, the training module 130 passes the pretext trained representation system 150-B (including the pretext trained video encoder 112-B and pretext trained audio encoder 110-B) to the contrastive learning training system 108. Additionally, the training module 130 passes training data (such as positive and negative pairs) used by the contrastive learning training system 108 to train the pretext trained representation system 150-B to perform contrastive learning tasks. Training the representation system 150-B using the contrastive learning training system 108 is described herein.

At numeral 4, the contrastive learning training system 108 passes the fully trained representation system 150-C (including the fully trained video encoder 112-C and fully trained audio encoder 110-C) back to the training module 130. The training module 130 may store the weights of the fully trained video encoder 112-C and fully trained audio encoder 110-C for use during deployment of the representation system 150.

Figure 2:
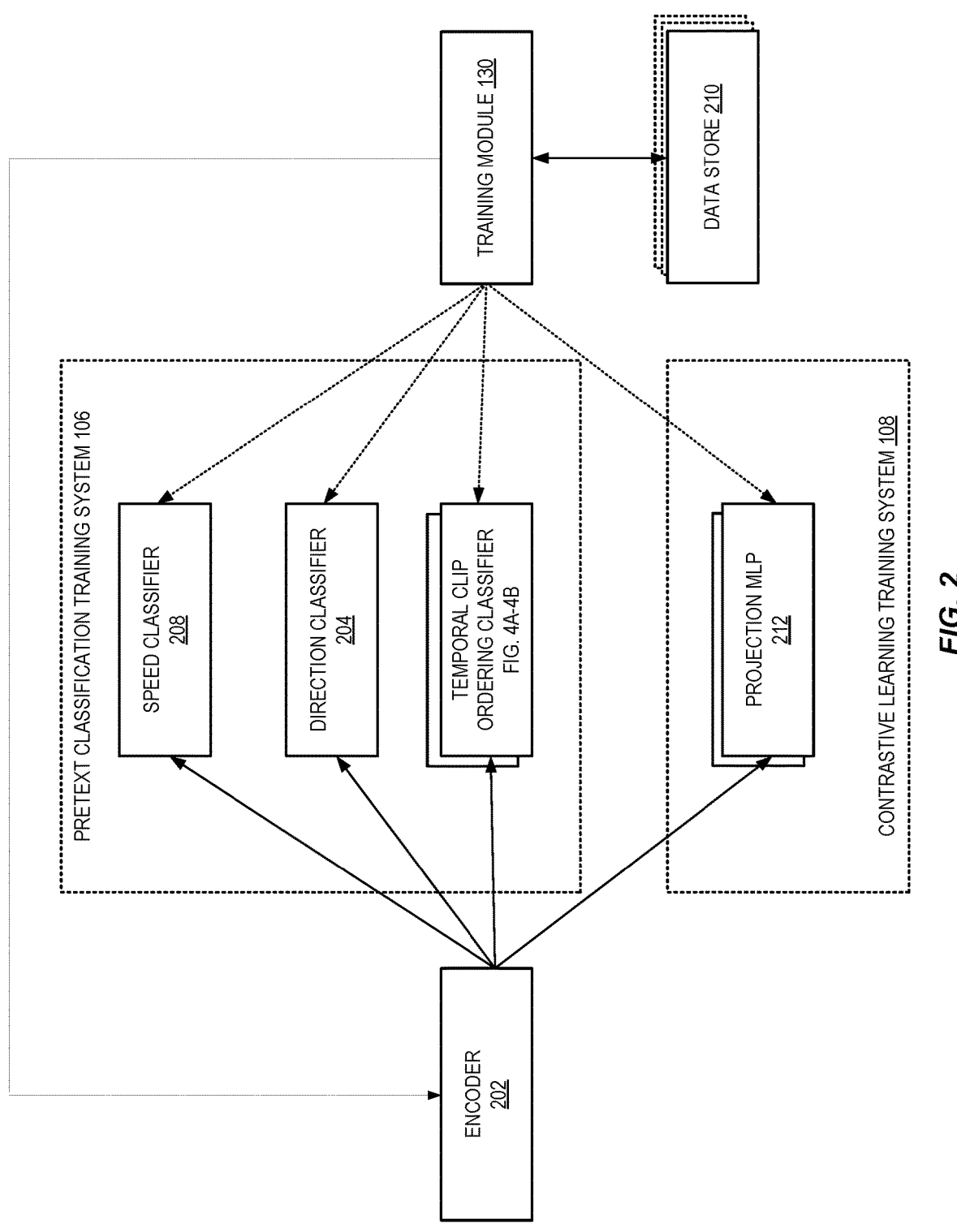
FIG. 2 illustrates a multi-headed architecture of the encoder, in accordance with one or more embodiments.

FIG. 2 illustrates a multi-headed architecture of the encoder 202, in accordance with one or more embodiments. A multi-headed architecture is used during training for multitask learning. Multitask learning is when a single machine learning model is trained to perform multiple tasks. A model that is trained using multitask learning includes one or more shared "backbone" layers and "heads" dedicated to perform a specific task. Each head includes the layers of a machine learning model required to perform/learn the specific task associated with that head. That is, each head may utilize a unique loss function to train the particular head to perform a task. Multitask learning improves efficiency as each head receives the same set of features (or other information) determined from the shared portion of the machine learning model (e.g., encoder 202). That is, for a three-headed model, the features received by each head are computed once (e.g., by the shared backbone) instead of three-times if each head of the model was its own machine learning model. This efficient sharing is useful in cases where the multitask model learns related tasks. The multitask learning is used to learn different features (short term features and long term features) of data such that a robust representation of the data is determined. That is, the audio encoder 110 learns to determine a robust representation of an audio signal, and the video encoder 112 learns to determine a robust representation of a video signal.

As shown in FIG. 1, both the audio encoder 110 and the video encoder 112 of the representation system 150 are trained to perform contrastive learning tasks and temporal pretext tasks using the pretext classification training system 106 and the contrastive learning training system 108 respectively. The encoder 202 is representative of both the audio encoder 110 and the video encoder 112 of the representation system because both the audio encoder 110 and the video encoder 112 undergo the same training. That is, the encoder 202 is the shared "backbone" of the multiheaded architecture.

Encoder 202 is trained to perform unitary intra-modal tasks such as classifying a playback speed (using speed classifier 208) and classifying a playback direction (using direction classifier 204). Moreover, encoder 202 is trained to perform pairwise intra and inter modal tasks such as temporal clip ordering using the temporal clip ordering classifier, as described in FIGS. 4A and 4B, and contrastive tasks using the projection multi-layer perceptron (MLP) 212. The speed classifier 208, the direction classifier 204, the temporal clip ordering classifier, and the projection MLP 212 are each heads sharing the result of the shared backbone (e.g., encoder 202).

The encoder 202 (including either the audio encoder 110 or the video encoder 112) determines a latent space representation of an input (e.g., a video window or an audio segment). The latent space representation is a representation such as a feature vector of extracted properties/characteristics of the input. In some embodiments, the audio encoder of encoder 202 is a two-dimensional convolutional neural network and the video encoder of encoder 202 is a three-dimensional convolutional neural network. However, other suitable encoders can be used as the audio encoder and/or video encoder. The audio encoder 110 determines a feature vector from an audio component of video data, and the video encoder 112 determines a feature vector from a video component of the video data. Such features are used as input to the speed classifier 208, the direction classifier 204, the temporal clip ordering classifier, and the MLP 212.

The pretext classification training system 106 trains the encoder 202 (e.g., the audio encoder and the video encoder) to learn the temporal features of the audio data and the video data using several temporal pre-text tasks. Pre-text tasks are tasks solved by a machine learning model (or heads of a machine learning model) to learn patterns and inferences of input data. Such learned relationships facilitate the heads to learn features of the input data. In this manner, the encoder 202 learns temporal features of both audio data and video data.

Specifically, the pretext classification training system 106 trains various classifiers to capture both short-term and longer-term features of the video data. For example, the speed classifier 208 and the direction classifier 204 are used to capture short-term audio/video features of video data. Such temporal pretext classification tasks are unitary tasks as a single video window and audio segment are classified by the video encoder and the audio encoder of the representation system respectively. The pretext classification training system 106 trains the speed classifier 208 and the direction classifier 204 in the audio domain and video domain respectively. The temporal clip ordering classifiers are used to capture longer-term features of video data by training the audio encoder and video encoder on clip-level tasks, where clips are audio segments or video windows of the video data. The pretext classification training system 106 trains such clip-level ordering in the video domain, the audio domain and the cross-modal domains.

The pretext classification training system 160 optimizes the weights of the encoder 202 based on the losses of each of the heads performing temporal pretext tasks. The losses used for training each of the heads may be any loss such as cross entropy loss, mean squared error loss, root mean squared error loss, and the like. Mathematically, the loss optimized by the pretext classification training system 160 is defined as Equation (1) below:

$$L_{PretextClassification} = L_{Speed} + L_{Direction} + L_{ClipOrder} \qquad (1)$$

The contrastive learning training system 108 trains the encoder 202 (e.g., the audio encoder and the video encoder) to learn features of the audio data and the video data using contrastive learning tasks. Specifically, projection layers (e.g., projection MLP 212) are trained by the contrastive learning training system 108 to learn intra modal and inter modal contrastive tasks. By training the audio encoder and video encoder on positive and negative pairs determined from the two modalities (e.g., audio and video) and on the direction of prediction (e.g., predicting a video representation from audio samples, predicting an audio representation from video samples, and predicting a video representation from video samples), the contrastive learning system 108 trains the encoder 202 to learn rich semantic information of the video data.

Contrastive learning is a mechanism of learning that utilizes self-supervised learning to minimize a distance (such as Euclidean distance) between similar samples in an embedding space and maximize a distance between dissimilar samples in the embedding space. The contrastive learning training framework used to train the projection MLP 212 involves one or more loss functions to push similar samples together and repel dissimilar samples away from each other. Accordingly, an input sample is compared to a similar sample (resulting in a positive pair) and a dissimilar sample (resulting in a negative pair). The contrastive learning training system 108 optimizes the weights of the encoder 202 based on the losses of each of the contrastive tasks. Mathematically, the loss optimized by the contrastive learning training system 108 is defined as Equation (2) below:

$$L_{CRL} = E_{v_i a_i}[l_{vv}(v_i^r, P_i^{vv}, N_i^{vv}) + l_{va}(v_i^r, P_i^{va}, N_i^{va}) + l_{av}(a_i^r, P_i^{av}, N_i^{av})] \quad (2)$$

In Equation (2) above, the loss optimized by the contrastive learning training system 108 $L_{CRL}$ is based on two modalities (e.g., the audio domain and the video domain) and on the direction of prediction (e.g., predicting a video feature vector from audio components of video data or predicting an audio feature vector from video components of video data). Specifically, $L_{CRL}$ uses the video-video loss contrastive term $l_{vv}$. As described herein, the video-video contrastive loss term uses the feature vector $v_i^r$, sample-dependent positive pairs $P_i^{vv}$ in the intra-modal video domain, and sample-dependent negative pairs $N_i^{vv}$ in the intra-modal video domain. The contrastive learning loss $L_{CRL}$ also uses the video-audio loss contrastive term $l_{va}$. As described herein, the video-audio loss term uses the feature vector $v_i^r$, sample-dependent positive pairs $P_i^{va}$ in the inter-modal audio domain, and sample-dependent negative pairs $N_i^{va}$ in the inter-modal audio domain. The contrastive learning loss $L_{CRL}$ also uses the audio-video loss contrastive term $l_{av}$. As described herein, the audio-video loss term uses the audio feature vector $\alpha_i^r$, sample-dependent positive pairs $P_i^{av}$ in the inter-modal video domain, and sample-dependent negative pairs $N_i^{av}$ in the inter-modal video domain.

Equation (3) below illustrates an example general form of the contrastive objective using the video-audio loss term.

$$l_{va}(v_i^r, P_i^{va}, N_i^{va}) =$$

$$\sum_{p,w \in P_i^{va}} -w \log\left(\frac{d(\phi_v(v_i^r), p)}{d(\phi_v(v_i^r), p) + \sum_{n \in N_i^{va}} d(\phi_v(v_i^r), n)}\right) \text{ where } d(x, y) = \tag{3}$$

$$\exp\left(\frac{1}{\lambda} \frac{x^T y}{\|x\|_2 \|y\|_2}\right)$$

As illustrated in Equation (3), $d(x, y)$ represents the similarity between the feature representations $x$ and $y$, $\lambda$ represents a temperature parameter, and $\phi_v$ represents a predictor MLP. As illustrated, the second argument (e.g., $y$) is not back propagated.

As a result of both the pretext classification training system 106 and the contrastive learning training system 108, the total loss optimized using the training module 130 is shown in Equation (4) below.

$$L_{SelfSupervisedLearning} = L_{CRL} + L_{PretextClassification} \tag{4}$$

The training module 130 provides training data to the pretext classification training system 106 and the contrastive learning training system 108. Specifically, training data is used to train each classifier head trained by the pretext classification training system 106 and the contrastive learning training system 108. The training module 130 generates training data by performing one or more augmentations to data.

For example, training data provided to the classifier heads may be augmented by one or more temporal transformations. Specifically, the training module 130 may perform a temporal transformation to randomly temporally crop video data to generate a video component and audio component. As described herein, video data randomly cropped by the training module 130 results in a video window (or one or more video frames) including visual content. The size of each temporally cropped video window may be the same size or different sizes. Similarly, the audio data is cropped by the training module 130, resulting in one or more audio segments including aural content. The size of each temporally cropped segment of the audio data may be the same size or different sizes. In some embodiments, each video window temporally cropped corresponds to a temporally aligned audio segment. In other words, at a given point in time, the video of the video window is accompanied by audio of the audio segment.

The training module 130 may also perform additional temporal transformations to the generated video components and audio components (e.g., video window and audio segment respectively). For example, the training module 130 may speed up or slow down the speed of a particular video window and the corresponding audio segment. In this manner, the training module 130 manipulates the playback speed. The training module 130 may be configured to manipulate the playback speed using any suitable technique. In one example implementation, the training module 130 speeds up the playback of the audio segment and/or the video window using temporal subsampling.

Another temporal manipulation performed by the training module 130 includes reversing the direction of a particular window and the corresponding audio segment. For example, the training module 130 may play the contents of a particular window in reverse.

The temporal manipulations ($\tau$) applied to the video domain for a particular video window are the same as the temporal manipulations applied to the audio domain for a corresponding (e.g., temporally aligned) audio segment. That is, $\tau_r(v_j)$, representing the temporal manipulation of a video window in the video domain, and $\tau_i(a_r)$, representing the temporal manipulation of an audio segment in the audio domain, represent the same moment in time in both the audio domain and the video domain. In operation, the training module 130 applies temporal transformations to both the raw audio signals and the raw video signals (e.g. the audio/video components of video data). Specifically, the training module 130 subsamples the audio signal (to perform speed-related temporal manipulations) and reverses the direction of the audio signal (to perform direction-related temporal manipulations) before computing a spectrogram. Additionally or alternatively, the training module 130 may perform the one or more temporal manipulations in the audio spectrogram (therefore not manipulating frequency).

In contrast, additional augmentations performed by the training module 130 on only the video domain include randomly spatially cropping the video data. For example, the training module 130 may zoom in/zoom out of the video data, resizing the video data. Additionally or alternatively, geometric augmentations, such as horizontal flipping, may be performed by the training module 130 on the video domain. Moreover, the training module 130 may also perform color-jittering. In some embodiments, such augmentations are performed by the training module 130 when creating positive and/or negative pairs as training data for the contrastive learning training system 108, as described herein. The augmentations applied to the video domain facilitate the video encoder learning invariances.

In some embodiments, the manipulations performed by the training module 130 are randomly sampled from a distribution of possible manipulations. For example, the training module 130 may randomly select a speedup class from classes such as 1×, 2×, 4×, and 8×. In other embodiments, the manipulations performed by the training module 130 are performed according to a sequence of manipulations.

The training module 130 generates training data in a self-supervised fashion. That is, the training module 130 performs one or more known manipulations on the audio data and/or the video data, resulting in a generated label corresponding to the performed one or more manipulations. For example, if the training module 130 speeds up the playback of a window and a corresponding audio segment by two, then the training module 130 can label the resulting sped up window and corresponding audio segment with an identifier indicating "2× speed up."

The training module 130 may also generate positive/ negative pairs for use as training data in the contrastive learning training system 108. As described herein, when generating positive/negative pairs, the training module 130 may query one or more data stores 210. The data store 210 is a database, a memory bank, a server, or an application that may be hosted by the training manager 100, hosted by one or more external systems, or some combination (e.g., a cloud storage system). The data store 210 includes previously computed feature vectors for data such as audio segments, video windows, audio components, video components, and the like.

The training module 130 is configured to determine sample-dependent positive/negative pairs using features of a training sample (e.g., a feature vector of a current window and/or a feature vector of a current audio segment) and prior feature vectors retrieved from the data store 210. Specifically, the training module 130 queries a data store for prior feature vectors of video windows of video components (e.g., a video signal of video data) and/or prior feature vectors of audio segments of audio components (e.g., an audio signal of video data). In some implementations, the training module 130 queries a data store 210 storing prior audio features (e.g., $Q_a$). In these implementations, the training module 130 queries a data store 210 storing prior video features (e.g., $Q_v$). In other implementations, a single data store 210 may include both prior audio features and prior video features.

FIG. 3 illustrates an example of positive pairs determined by the training module for use as training data in the contrastive learning training system, in accordance with one or more embodiments. Inter-modal (or cross-modal) positive pairs such as positive pair 320 may be determined by the training module 130 using a video window 320A of the video component 302 and a corresponding (e.g., temporally aligned) audio segment 320B of the audio component 304. The training module 130 may also determine intra-modal positive pairs. For example, positive pair 322 indicates a positive pair including a first video window 322A and a second video window 322B of the video component 302. In this manner, the training module 130 determines positive pairs from a current video data (including video component 302 and audio component 304). The current video data is referred to herein as a mini-batch B.

The training module 130 can determine negative pairs using a data store (such as data store 210 of FIG. 2). Additionally, the training module 130 extends the set of positive samples using the data store. As described herein, the training module 130 determines sample-dependent positive/negative pairs using features of a training sample (e.g., a feature vector of a current video window and/or a feature vector of a current audio segment) and prior feature vectors retrieved from the data store. Specifically the training module 130 queries prior feature vectors of video components and/or prior feature vectors of audio components.

In particular, prior feature vectors that are "closest" to the training sample (e.g., the current feature vector of the window and/or audio segment) are determined by the training module 130 to be positive samples. In contrast, prior feature vectors that are a threshold number of samples away from the training sample are determined by the training module 130 to be "farther" feature vectors and therefore negative samples.

The training module 130 determines the closest prior feature vectors to the training sample by comparing the similarity of the current feature vector of the video window and/or the audio segment to a portion of (or all) the prior feature vectors stored in the data store. The training module 130 determines the similarity of the prior feature vectors and the current feature vector using any suitable similarity calculation. For example, the training module 130 may compute the cosine similarity between a prior feature vector retrieved from the data store and the current feature vector determined by the audio encoder or the video encoder.

Subsequently, the training module 130 sorts the prior feature vectors based on the similarity to the current feature vector. The prior feature vectors up to (and/or satisfying) a threshold are determined to be the "closest" prior feature vectors. The prior feature vectors after (and/or satisfying) the threshold are determined to be the "farther" historic feature maps. In some implementations, the training module 130 determines the closest prior feature vectors using a first threshold, and the training module 130 determines the farther prior feature vectors using a second threshold.

In some embodiments, the threshold used to distinguish "close" historic feature maps from "far" historic feature maps is a predetermined number of prior feature vectors. For example, k nearest neighbor prior feature vectors are determined to be positive samples. In a particular example, if k=4, then the first four prior feature vectors are determined to the positive samples and any prior feature vector after the fourth prior feature vector are determined to be negative samples.

Mathematically, the set of sample dependent positive pairs and sample dependent negative pairs can be represented in Equations (5)-(8) below. In Equations (5) and (6), the video feature vector $v_i^r$ is the output of the video encoder $F_v$ (such as encoder 202, and specifically video encoder 112) followed by a projection MLP $\psi_v$ (such as projection MLP 212) for an input with a temporal transformation $\tau_r(v_i)$ determined by the training module 130. Mathematically, $v_i^r = \psi_v(F_v(\tau_r(v_i))$. Augmentations of the video data for the video feature vector $v_i$ are represented as $\hat{v}_i^s$. Equations (5) and (6) represent the set of positive and negative pairs in the intra-modal video domain. In Equations (7) and (8), the audio feature vector $\alpha_i^r$ is the output of the audio encoder $F_a$ (such as encoder 202, and specifically audio encoder 110) followed by a projection MLP $\psi_a$ (such as projection MLP 212) for an input with a temporal transformation $\tau_r(a_i)$ determined by the training module 130. Mathematically, $\alpha_i^r = \psi_a(F_a(\tau_r(a_i)))$. Equations (7) and (8) represent the set of positive and negative pairs in the inter-modal domain.

$$P_i^{vv} = \{(\hat{v}_i^s, 1)\} \cup NN_{1:k}(\hat{v}_i^s, Q_v) x W_{1:k}(\hat{v}_i^s) \tag{5}$$

Equation (5) above represents the sample-dependent positive pairs $P_i^{vv}$ determined by the training module 130 in the intra-modal video domain for a video feature vector $v_i^r$. The set of positive pairs for a video feature vector $v_i^r$ includes data augmented versions of the video feature vector (such as $\hat{v}_i^s$). Additionally, the set of positive pairs includes $NN_{1:k}$ ($\hat{v}_i^s$, $Q_v$), or the set of k nearest neighbors from 1 to k of the augmented feature vector $\hat{v}_i^s$ determined from the data store $Q_v$ (illustrated as data store 210). In some embodiments, the number of k nearest neighbors is set to 5. It should be appreciated that the positive pairs are not temporally aligned.

As shown in Equation (5), the k nearest neighbors of the set of positive pairs extracted from the data store $Q_v$ are weighted. In some embodiments, the training module 130 weighs each of the extracted positive pairs from the data store of equal importance. In other embodiments, the training module 130 weighs the extracted positive pairs according to a cross-view similarity. For example, the training module 130 weighs the extracted positive pairs through the feature space similarity to the augmented feature vector $\hat{v}_i^s$. An example of weighting the set of positive pairs according to feature space similarity is represented in Equation (9) below.

$$N_i^{vv} = \{v_j \in B | j \neq i\} \cup NN_{q:q+m}(\hat{v}_i^s, Q_v) \qquad (6)$$

Equation (6) above represents the sample-dependent negative pairs $N_i^{vv}$ for a video feature vector $v_i^r$ determined by the training module 130. The negative pairs $N_i^{vv}$ are generated using the cross-view induced neighborhood structure such that the negative pairs are sample dependent. The negative pairs contain all of the video features (or a portion of the video features) not belonging to the video feature vector $v_i$ in the current training batch B. Additionally, the negative pairs are the set of nearest neighbors from q to q+m of the augmented feature vector is determined from the data store $Q_v$. In some embodiments, $$q = \frac{\text{size of data store}}{2}$$

such that the negative samples start at the nearest neighbor in the data store $Q_v$ at least a medium distance to the augmented video feature vector $\hat{v}_i^s$. By determining the set of negative pairs in this sample-dependent manner (using nearest neighbors, for instance), the difficulty of the negative samples is controlled. For example, negative samples may be excluded to prevent ambiguous or confusing negative samples resulting from duplicates and/or class imbalance.

$$P_i^{va} = \{(\alpha_i^r, 1)\} \cup NN_k(\alpha_i^r, Q_a) x W_{1:k}(\alpha_i^r) \qquad (7)$$

$$P_i^{av} = \{(v_i^r, 1)\} \cup NN_k(v_i^r, Q_v) x W_{1:k}(v_i^r)$$

Equation (7) above represents sample-dependent positive pairs $P_i^{va}$ and $P_i^{va}$ determined by the training module 130 in the inter-modal video/audio domain for a video feature vector $v_i^r$. The set of positive pairs for the video feature vector $v_i^r$ includes temporally aligned identically transformed audio feature vector $\alpha_i^r$. Such temporal alignment is important for cross-modal contrastive learning. Additionally, the set of positive pairs includes $NN_k(\alpha_i^r, Q_a)$, or the set of k nearest neighbors of the audio feature vector $\alpha_i^r$ and the video feature vector $v_i^r$ determined from the data stores $Q_a$ and $Q_v$ respectively.

As shown in Equation (7), the k nearest neighbors of the set of positive pairs extracted from the data store $Q_v$ and $Q_a$ are weighted. In some embodiments, the training module 130 weighs each of the extracted positive pairs from the data store of equal importance. In other embodiments, the training module 130 weighs the extracted positive pairs according to a cross-view similarity. For example, the training module 130 weighs the extracted positive pairs through the feature space similarity to the temporally aligned sample in the other modality. For example, the set of positive pairs $P_i^{va}$ are weighted through the feature space similarity to the temporally aligned audio sample (e.g., audio feature vector $\alpha_i^r$), and the set of positive pairs $P_i^{av}$ are weighted through the feature space similarity to the temporally aligned video sample (e.g., video feature vector $v_i^r$). An example of weighting the set of positive pairs according to feature space similarity is represented in Equation (9) below.

$$N_i^{va} = \{v_j \in B | j \neq i\} \cup \{\alpha_j \in B | j \neq i\} \cup NN_{q:q+m}(\alpha_i^r, Q_a) \qquad (8)$$

$$N_i^{av} = \{v_j \in B | j \neq i\} \cup \{\alpha_j \in B | j \neq i\} \cup NN_{q:q+m}(v_i^r, Q_v)$$

Equation (8) above represents the sample-dependent negative pairs $N_i^{va}$ and $N_i^{av}$ for a video feature vector $v_i^r$ determined by the training module 130. The negative pairs contain all of (or a portion of) the video features and audio features not belonging to the video feature vector $v_i$ and the audio feature vector $\alpha_i$ in the current training batch B. Additionally, the negative pairs are the set of nearest neighbors from q to q+m of the audio feature vector $\alpha_i^r$ and the video feature vector $v_i^r$ determined from the data stores $Q_a$ and $Q_v$ respectively. By determining the set of negative pairs in this sample-dependent manner (using nearest neighbors, for instance), the difficulty of the negative samples is controlled. For example, negative samples may be excluded to prevent ambiguous or confusing negative samples resulting from duplicates and/or class imbalance.

$$W_{1:k}(v) = \{w_1 \ldots w_k\} \qquad (9)$$

$$w_j = \frac{d(v, n_j)}{\sum_{n_l \in NN_{1:k}(v_i, Q_v)} d(v, n_l)}$$

$$\text{where } d(x, y) = \exp\left(\frac{1}{\lambda} \frac{x^T y}{\|x\|_2 \|y\|_2}\right)$$

Equation (9) above represents the set of weights applied to the set of positive pairs extracted from the data store $Q_a$ or $Q_v$. The weights $w_j$ applied to each prior feature vector extracted from the data store is proportional to the similarity of the nearest neighbor $n_j$ to v (either the audio feature vector $\alpha_i^r$ or the video feature vector $v_i^r$).

In other embodiments, the threshold used by the training module 130 to determine "close" historic features (and therefore positive samples) is a predetermined threshold similarity score. For example, if the threshold is 0.8, any prior feature vectors resulting in a similarity score of 0.8 and above are determined to be positive samples. In contrast, any prior feature vectors resulting in a similarity score of 0.79 and below are determined to be negative samples. In some embodiments, the threshold is determined by one or more users (e.g., administrators). In other embodiments, the threshold is dynamically determined by the training module 130 over time. For example, the threshold is adjusted by the training module 130 based on the contrastive loss error.

FIGS. 4A-4B illustrate a Siamese network used in classifying temporal clip ordering, in accordance with one or more embodiments. Configuring the temporal clip ordering classifier as a Siamese network is one non-limiting way to configure pairwise learning. As described herein, the temporal clip ordering classifiers perform pairwise inter and intra modal classifications.

As illustrated in FIGS. 4A-4B, the example classifiers include video classifier 410 (e.g., the video-video intra-modal classifier $\phi_{vv}$), audio classifier 402 (e.g., the audio-audio intra-modal classifier $\phi_{aa}$), video/audio classifier 412 (e.g., the video-audio inter-modal domain classifier $\phi_{va}$), and audio/video classifier 414 (e.g., the audio-video inter-modal domain classifier $\phi_{av}$).

Each classifier (e.g., video classifier 410, audio classifier 402, video/audio classifier 412, and audio/video classifier 414) includes two encoders as part of the Siamese framework. For example, video classifier 410 includes video encoder 112 and identical video encoder 112, audio classifier 402 includes audio encoder 110 and identical audio encoder 110, and both video/audio classifier 412 and audio/video classifier 414 include both audio encoder 110 and video encoder 112. In operation, a single encoder may receive each input and determine a classification. For example, video classifier 410 uses the video encoder 112 to determine an output corresponding to the first video window, and subsequently, the same video encoder 112 determines another output corresponding to the second video window. As a result, computing resources such as memory are conserved by executing a single encoder (e.g., video encoder 112 or audio encoder 110) twice, one time for each input.

The classifiers use two encoders (in a Siamese fashion) and compare the similarity of features determined by each encoder using the class selector 406. For example, the class selector 406 compares the similarity of two feature vectors using cosine similarity, Euclidean distance, a correlation of features in the feature vectors, and the like. In some implementations, the class selector 406 determines a temporal clip ordering classification by mapping the similarity score to a classification using one or more thresholds. In this manner, the class selector 406 performs a three-way classification of two temporal signals to identify whether the two signals are correctly ordered, overlapping, or wrongly ordered. As described, the temporal clip ordering classifiers classify the inputs into three classes, however the temporal clip ordering classifier may be trained to classify the inputs into other classes.

As shown, each classifier receives two inputs (e.g., time signals such as video windows and/or audio segments) such that the classifier can determine the temporal ordering. However, it should be appreciated that each classifier may receive one input of a concatenated representation of two time signals along the channel dimension.

Figure 5:
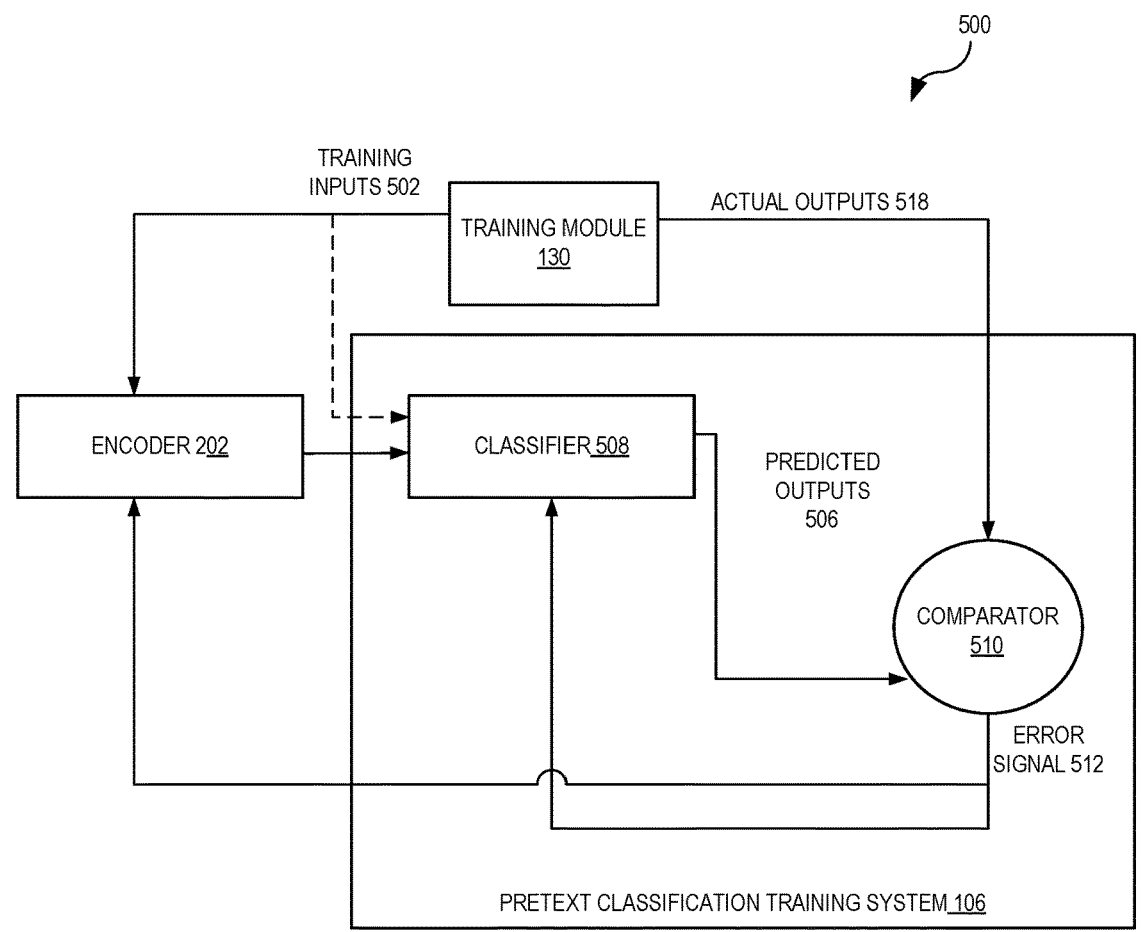
FIG. 5 illustrates an example process of self-supervised learning used to train classifiers of the pretext classification training system to perform the temporal pretext tasks, in accordance with one or more embodiments.

FIG. 5 illustrates an example process of self-supervised learning used to train classifiers of the pretext classification training system to perform the temporal pretext tasks, in accordance with one or more embodiments. Supervised learning is a method of training a machine learning model given input-output pairs. An input-output pair is an input with an associated known output (e.g., an expected output, a labeled output, a ground truth). Because the training module 130 determines the outputs corresponding to the inputs, the learning is considered self-supervised.

As described herein, the training module 130 generates training data by applying one or more temporal manipulations to an audio component and/or a video component. In these embodiments, the input of the input-output pair is the manipulated data, and the corresponding output is the known one or more manipulations applied to the data.

Additionally or alternatively, the training module 130 generates training data by sampling one or more audio segments and/or video windows (referred to herein as "clips") from an audio component and/or a video component respectively. In these embodiments, the input of the input-output pair is two clips, and the corresponding output is whether the two clips were sampled in sequence (e.g., the two clips are "correctly ordered), sampled out of sequence (e.g., the two clips are incorrectly ordered), or overlapping (e.g., one or more audio segments and/or video segments overlap between the first clip and the second clip). Sampling the clips "in sequence" refers to sampling the first clip at a first point in time and sampling the second clip at a second point in time after the first point in time. Sampling the clips "out of sequence" refers to sampling the first clip at a point in time after sampling the second clip.

The pretext classification training system 106 is used to train the classifiers 508 on input-outputs pairs. Classifiers 508 refer broadly to heads of encoder 202. The encoder 202 represents both an audio encoder 110 and a video encoder 112. Specifically, there are unitary classifiers such as a speed classifier (e.g., the speed classifier head 208), and a direction classifier (e.g., the direction classifier head 204), and pairwise classifiers such as temporal clip ordering classifiers (e.g., video classifier 410, audio classifier 402, video/audio classifier 412, and audio/video classifier 414 as described in FIGS. 4A-4B). The pretext classification training system 106 also trains the encoder backbone (e.g., encoder 202) based on the accuracy of the classifiers 508.

As a result of the self-supervised training, the encoder 202 and classifiers 508 learn how to predict known outputs (e.g., classification such as a playback speed, a playback direction, and a clip ordering) given known inputs (e.g., one or more audio segments or video windows). The unitary classifier learns intra-modal classification and the pairwise classifiers lean both intra-modal and inter-modal classification.

Specifically, if the pretext classification training system 106 is training a unitary classifier such as the speed classifier head (one example of classifier 508) of the audio encoder (one example of encoder 202), the training module 130 may provide, as training input 502, a sped up (or slowed down) audio segment. The training module 130 also provides, as actual output 518, a corresponding label such as the temporal manipulation applied to the audio segment indicating the amount that the audio segment was sped up (or slowed down).

Similarly, if the pretext classification training system 106 is training a unitary classifier such as the speed classifier head (one example of classifier 508) of the video encoder (one example of encoder 202), the training module 130 may provide, as training input 502, a sped up (or slowed down) video segment. The training module 130 also provides, as actual output 518, a corresponding label such as the temporal manipulation applied to the video segment indicating the amount that the video segment was sped up (or slowed down).

If the pretext classification training system 106 is training a unitary classifier such as the direction classifier head (one example of classifier 508) of the audio encoder (one example encoder 202), the training module 130 may provide, as training input 502, an audio segment in a playback direction (e.g., forward or reverse). The training module 130 also provides a corresponding label indicating the playback direction as actual output 518.

Similarly, if the pretext classification training system 106 is training a unitary classifier such as the direction classifier head (one example of classifier 508) of the video encoder (one example encoder 202), the training module 130 may provide, as training input 502, a video segment in a playback direction (e.g., forward or reverse). The training module 130 also provides a corresponding label indicating the playback direction as actual output 518.

If the pretext classification training system 106 is training pairwise classifiers (e.g., video classifier 410, audio classifier 402, video/audio classifier 412, and audio/video classifier 414 as described in FIGS. 4A-4B), the training module 130 provides two inputs to the pretext classification training system 106. For example, the first input passed to the video classifier 410 and video/audio classifier 412 may be a video window. Similarly, the first input passed to the audio classifier 402 and audio/video classifier 414 may an audio segment. The second input passed to the video classifier 410 and audio/video classifier 414 may be a video window. Similarly, the second input passed to the audio classifier 402 and the video/audio classifier 412 may be an audio segment.

To train the unitary classifiers (e.g., the speed classifier 208 and the direction classifier 204), the training module 130 provides a training input 502 to the encoder 202 and/or classifier 508. To train the pairwise classifiers (e.g., video classifier 410, audio classifier 402, video/audio classifier 412, and audio/video classifier 414 as described in FIGS. 4A-4B), the training module 130 provides two training inputs 502 to the encoder 202 and/or classifier 508. As described herein, the encoder 202 extracts a feature vector from the training input 502. That is, audio encoder 110 determines an audio feature vector from an audio segment, and video encoder 110 determines a video feature vector from a video window.

After the classifier 508 (including both the unitary classifiers and the pairwise classifiers) has received the one or more training inputs 502, the classifier 508 classifies the received training input(s).

For example, the encoder 202 and unitary classifier 508 use the training input 502 (e.g., the temporally manipulated signal in the audio/video domain) to predict output 506 by applying the current state of the classifier 508 to the training input 502 and/or feature vector determined by the encoder 202. Specifically, the classifier 508 may use a softmax function, or a normalized exponential function, to transform real numbers into a normalized probability distribution over predicted output classes. For example, the classes of the speed classifier may include 1×, 2× speed up, 4× speed up, 8× speed up, 2× speed down, 4× speed down, 8× speed down. The classes of the direction classifier may include forward or reverse. The classifier 508 creates a vector of probabilities corresponding to the probability of the training input 502 belonging to a particular class. The vector of probabilities becomes the predicted output 506.

The pairwise classifier 508 determines a similarity of feature vectors determined by the encoders 202 from the training inputs 502 (e.g., two intra-modal or inter-modal clips). The pairwise classifier 508 calculates a similarity between the feature vector associated with the first input and the feature vector associated with the second input. As described herein, the similarity may be a cosine similarity, Euclidean distance, a correlation of features in the feature vectors, and the like. For example, contrastive loss is one example technique to determine the similarity between feature vectors using distance. Feature vectors are determined to be more similar when they are close together in Euclidean space (e.g., two points have a low Euclidean distance). Similarly, feature vectors are determined to be more dissimilar when they are father apart in Euclidean space (e.g., two points have a high Euclidean distance). The similarity of the two feature vectors associated with the two training inputs 502 become the predicted output 506

Subsequently, the predicted output 506 of the classifier 508 (including the unitary classifier and the pairwise classifier) is compared using the comparator 510 to the actual output 518 to determine an amount of error or difference from the predicted output 506 and the actual output 518. For example, the predicted output 506 (e.g., a vector of probabilities determined by the unitary classifier or the similarity of the two feature vectors determined by the pairwise classifier) is compared to a one-hot encoded sparse vector indicating the actual output 518, using the comparator 510.

The error, represented by error signal 512, is used to adjust the weights in the classifier 508 such that the classifier 508 changes (or learns). For example, the unitary classifiers learn to predict the temporal manipulations applied to the video signal based on the short-term learned features of the video signal. Similarly, the pairwise classifiers learn to predict clip ordering based on the longer-term learned features of the video signal. Additionally, the error signal 512 is communicated back to the encoder 202 such that the encoder 202 changes (or learns) over time to predict a more accurate feature vector to be used in each classifier head. In some implementations, the error signal 512 is not propagated back to the encoder 202.

In one implementation, the classifier 508 and the encoder 202 are trained using the backpropagation algorithm. The backpropagation algorithm operates by propagating the error signal 512 through the classifier 508 and the encoder 202. The error signal 512 may be calculated each iteration (e.g., each pair of training inputs 502 and associated actual outputs 518), batch, and/or epoch and propagated through all of the algorithmic weights of the classifier 508 and encoder 202 such that the algorithmic weights are adapted based on the amount of error. The error is minimized using a loss function. Non-limiting examples of loss functions may include the square error function, the root mean square error function, and the like.

The weighting coefficients of the classifier 508 and encoder 202 are tuned to reduce the amount of error, thereby minimizing the differences between (or otherwise converging) the predicted output 506 with the actual output 518. For example, the speed classifier outputs a speed classification that is similar to the actual speed classification, and the direction classifier outputs a direction classification that is similar to the actual direction classification. The classifier 508 and encoder 202 are trained until the error determined by the comparator 510 is within a certain threshold (or a threshold number of batches, epochs, or iterations have been reached).

Figure 6:
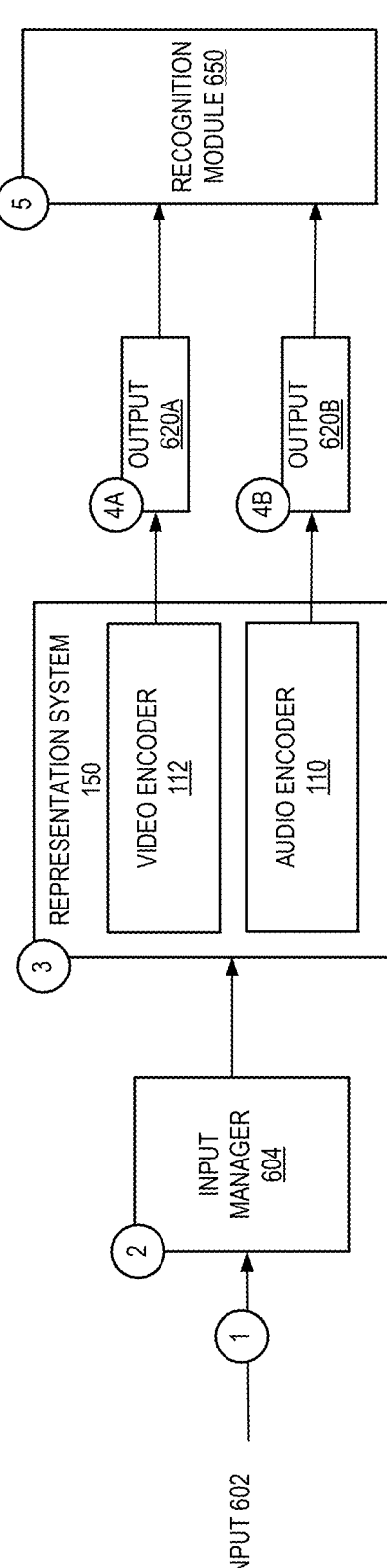
FIG. 6 illustrates deployment of the trained video encoder and audio encoder, in accordance with one or more embodiments.

FIG. 6 illustrates deployment of the trained video encoder and audio encoder, in accordance with one or more embodiments. At numeral 1, input 602 is fed to the input manager 604. Specifically, input 602 is data including both audio components and video components such as video data. At numeral 2, the input manager 604 is configured to perform any one or more processing operations on the video data. For example, the input manager 604 may decompose the video data into unique components such as the audio component and the video component. Additionally, the input manager 604 may sample the video data (including the audio components and/or video components), quantize the video data, normalize the video data, and the like. The input manager 604 may also transform the audio component of the video data into a spectrogram representation of the audio component using any suitable technique.

At numeral 3, the trained representation system 150 (specifically, fully trained representation system 150-C in FIG. 1) operates on the input 602. Specifically, the video encoder 112 (e.g., fully trained video encoder 112-C in FIG. 1) and the audio encoder 110 (e.g., fully trained audio encoder 110-C in FIG. 1) generate robust feature vectors. At numeral 4A, the robust video feature vector (output 620A) is passed to the recognition module 650 at numeral 5. Similarly, at numeral 4B, the robust audio feature vector (output 620B) is passed to the recognition module 650. The feature vectors output 620A-B are robust as a result of the trained video encoder 112 and audio encoder 110.

The recognition module 650 receives the robust feature vectors output 620A-B and performs an operation using the feature vectors. For example, the recognition module 650 may be any processing module such as a module configured to perform video processing tasks such as video retrieval tasks, action recognition tasks, classifying frames of a video, tagging video frames, searching video frames for objects, video fingerprinting, etc., audio processing tasks such as audio retrieval tasks, action recognition tasks, classifying audio data, tagging audio data, searching audio data for words/speakers, audio fingerprinting, etc., and the like.

Specifically, the recognition module 650 may be a video fingerprinting module that reduces the dimension of an input (including the output 620A and 620B), hashing the received input such that the input 602 can be uniquely identified. Such techniques may be useful in authenticating data, searching for data, and the like. The recognition module 650 may output a result based on the processing performed by the recognition module. For example, the recognition module 650 may output a result to one or more downstream processing modules. The one or more downstream processing modules may display the result determined by the recognition module 650, store the result determined by the recognition module 650, perform subsequent processing, or some combination.

Figure 7:
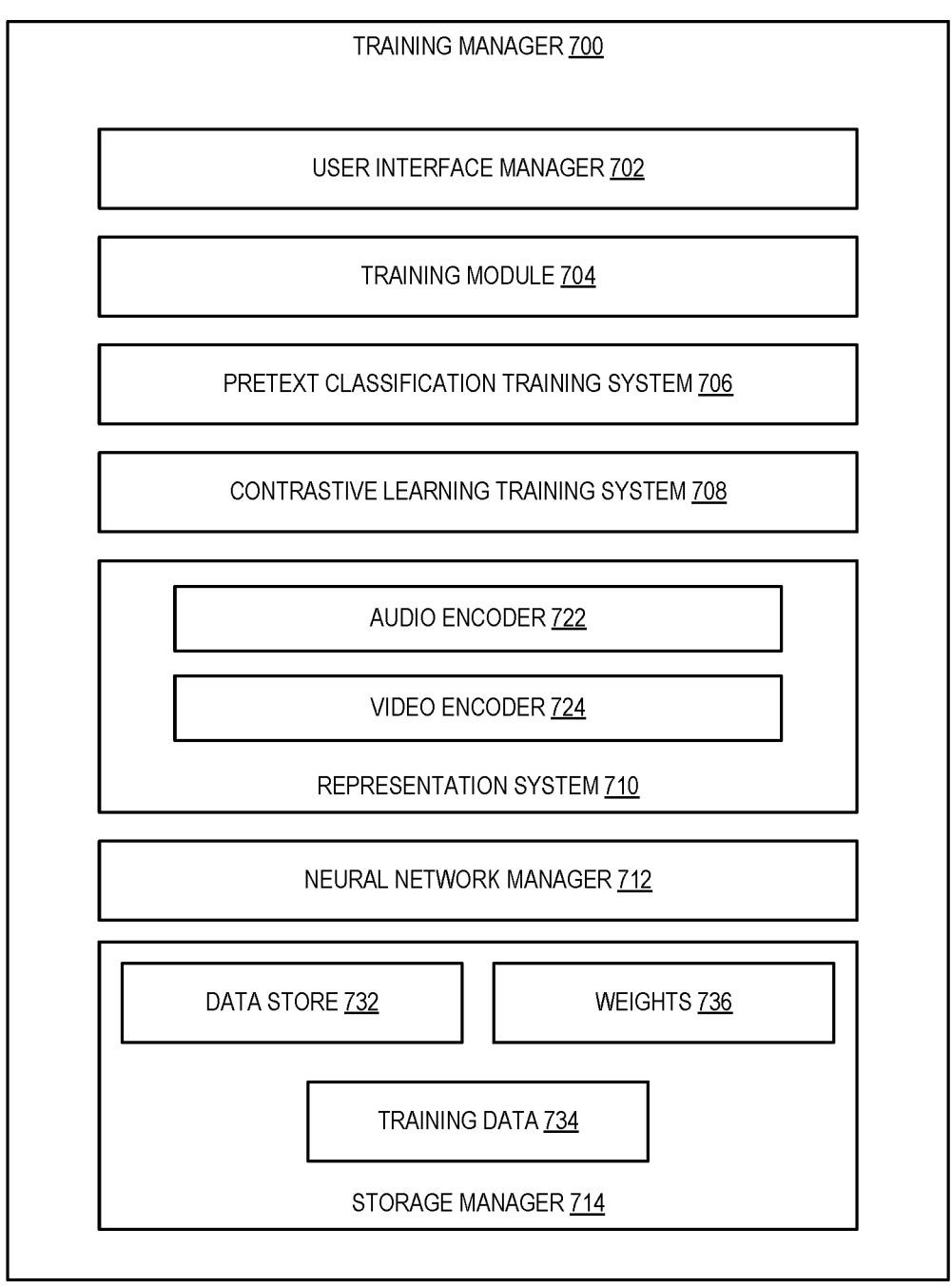
FIG. 7 illustrates a schematic diagram of a training system in accordance with one or more embodiments.

FIG. 7 illustrates a schematic diagram of training system (e.g., "training system" described above) in accordance with one or more embodiments. As shown, the training manager 700 may include, but is not limited to, a user interface manager 702, a training module 704, a pretext classification training system 706, a contrastive learning training system 708, a representation system 710, a neural network manager 712, and a storage manager 714. The representation system 710 includes the audio encoder 722 and the video encoder 724. The storage manager 714 includes data store 732.

As illustrated in FIG. 7, the training manager 700 includes a user interface manager 702. The user interface manager 702 allows a user such as an administrator to set one or more parameters of the training manager 700, initiate the training manager 700, exit the training manager 700 and the like. For example, parameters set by an administrator using the user interface manager 702 includes a number of training iterations, the temperature parameter ($\lambda$), and the like. The user interface manager 702 receive mouse movements, mouse compression/decompression (e.g., a mouse click), user interactions with a screen (e.g., haptic feedback), voice commands, keyboard entries, and the like. The user interface manager 702 also enables the user to view a result of the training manager 700 (e.g., parameters, results, statistics, and the like).

As illustrated in FIG. 7, the training manager 700 also includes a representation system 710. The representation system 710 includes an audio encoder 722 and a video encoder 724. The audio encoder 722 determines a latent space representation (e.g., a feature vector) of an audio signal input. Similarly, the video encoder 724 determines a latent space representation (e.g., a feature vector) of a video signal input. As described with reference to FIG. 2, the audio encoder 722 and video encoder 724 are trained using a multiheaded architecture. Each head of the multiheaded network is configured to perform a different task. Each of the tasks allow the audio encoder 722 and the video encoder 724 of the representation system to learn different patterns/relationships of audio data and video data respectively. As described herein, the audio encoder 722 and video encoder 724 are trained to perform temporal pretext classification tasks and contrastive learning tasks using the pretext classification training system 706 and the contrastive learning training system 708 respectively.

As described herein, the pretext classification training system 706 trains the encoders of the representation system 710 (e.g., audio encoder 722 and video encoder 724) to learn temporal features of video data (including audio components and video components) using several temporal pre-text tasks. Specifically, the pretext classification training system 706 trains the encoders of the representation system 710 to classify a speed of an input, classify a direction of an input, and classify an order of a pair of inputs. Accordingly, the pretext classification training system 706 trains the encoders of the representation system 710 by training unitary classifier heads and pairwise classifier heads of a multi-headed architecture.

As described herein, the contrastive learning training system 708 trains the encoders of the representation system 710 (e.g., audio encoder 722 and video encoder 724) to learn features of the video data (including audio components and video components) using contrastive learning tasks. Specifically, projection layers are trained by the contrastive learning training system 708 to learn intra modal and inter modal contrastive tasks.

As illustrated in FIG. 7, the training manager 700 also includes a training module 704. The training module 704 can teach, guide, tune, and/or train one or more neural networks. In some embodiments, the training module 704 optimizes the losses from the pretext classification training system 706 and the contrastive learning training system 708. As the audio encoder 722 and video encoder 724 are trained (e.g., by the pretext classification training system 706 and the contrastive learning training system 708), the training module 704 may receive weights 736 of the partially trained and/or fully trained audio encoder 722 and video encoder 724. The weights 736 represent the current state of the encoders. The training module 704 stores such weights 736 such that the audio encoder 722 and video encoder 724 can use the weights 736 during deployment (or during an inference time). As described herein, when the audio encoder 722 and video encoder 724 are deployed, the audio encoder 722 and video encoder 724 generate representations of audio data and video data that are fed to one or more downstream processing modules (e.g., modules configured to perform video processing tasks such as video retrieval tasks, action recognition tasks, classifying frames of a video, tagging video frames, searching video frames for objects, video fingerprinting, etc., audio processing tasks such as audio retrieval tasks, action recognition tasks, classifying audio data, tagging audio data, searching audio data for words/speakers, audio fingerprinting, etc., and the like).

The training module 704 provides the pretext classification training system 706 and the contrastive learning training system 708 with input-output pairs during training (e.g., training data 734). As described herein, the training module 704 generates the input-output pairs used during training such that training is performed in a self-supervised manner. Specifically, the training module 704 may perform one or more temporal transformations to an audio component of video data and a video component of video data.

For example, the training module 704 may perform a temporal transformation to randomly temporally crop video data to generate a video component and audio component. As described herein, video data randomly cropped by the training module 704 results in a video window (or one or more video frames) including visual content. Similarly, the audio data is cropped by the training module 704, resulting in one or more audio segments including aural content. In some embodiments, each video window temporally cropped corresponds to a temporally aligned audio segment. In other words, at a given point in time, the video of the video window is accompanied by audio of the audio segment.

Additionally or alternatively, the training module 704 may speed up or slow down the speed of a particular video window and the corresponding audio segment. In this manner, the training module 704 manipulates the playback speed. Another temporal manipulation performed by the training module 704 includes reversing the direction of a particular window and the corresponding audio segment. For example, the training module 704 may play the contents of a particular window in reverse.

The training module 704 is also configured to generate positive/negative pairs for use as training data 734. When generating positive/negative pairs, the training module 704 may query one or more data stores. As described herein, data stores may be local (e.g., stored by the storage manager 714) and/or external. After training data 734 is generated by the training module 704, it may be stored in the storage manager 714.

As illustrated in FIG. 7, the training manager 700 includes a neural network manager 712. Neural network manager 712 may host a plurality of neural networks or other machine learning models, such as multi layer perceptrons including prediction MLPs (e.g., unitary classifier heads and pairwise classifier heads), projection MLPs (e.g., contrastive learning heads), and encoders (e.g., audio encoder 722 and video encoder 724).

The neural network manager 712 may include an execution environment, libraries, and/or any other data needed to execute the machine learning models. In some embodiments, the neural network manager 712 may be associated with dedicated software and/or hardware resources to execute the machine learning models. Although depicted in FIG. 7 as being hosted by a single neural network manager 712, in various embodiments the neural networks may be hosted in multiple neural network managers and/or as part of different components. For example, the pretext classification training system 706 can be hosted by a first neural network manager (or other host environment), in which the respective neural networks execute. Similarly, the contrastive learning training system 708 can be hosted by a first neural network manager (or other host environment), in which the respective neural networks execute.

In other embodiments, groups of machine learning models may be executed by their own neural network manager or other host environment. Additionally, or alternatively, each machine learning model (or groups of machine learning models) may be spread across multiple neural network managers depending on, e.g., the resource requirements, traffic, lag, etc.

As illustrated in FIG. 7, the training manager 700 also includes a storage manager 714. The storage manager 714 maintains data for the training manager 700. The storage manager 714 can maintain data of any type, size, or kind as necessary to perform the functions of the training manager 700. For example, the storage manager 714, as shown in FIG. 7, includes the training data 734. As described herein, the training module 704 generates the training data 734 and such training data may be stored by the storage manager 714. The storage manager 714 may also store data store 732. As described herein, the data store 732 includes previously computed feature vectors for data such as audio segments, video windows, audio components, video components, and the like. Additionally or alternatively, the storage manager 714 may store addresses (e.g., memory addresses, URL addresses, MAC addresses, IP addresses, port addresses, etc.) in which to query external data stores.

Each of the components 702-714 of the training manager 700 and their corresponding elements (as shown in FIG. 7) may be in communication with one another using any suitable communication technologies. It will be recognized that although components 702-714 and their corresponding elements are shown to be separate in FIG. 7, any of components 702-714 and their corresponding elements may be combined into fewer components, such as into a single facility or module, divided into more components, or configured into different components as may serve a particular embodiment.

The components 702-714 and their corresponding elements can comprise software, hardware, or both. For example, the components 702-714 and their corresponding elements can comprise one or more instructions stored on a computer-readable storage medium and executable by processors of one or more computing devices. When executed by the one or more processors, the computer-executable instructions of the training manager 700 can cause a client device and/or a server device to perform the methods described herein. Alternatively, the components 702-714 and their corresponding elements can comprise hardware, such as a special purpose processing device to perform a certain function or group of functions. Additionally, the components 702-714 and their corresponding elements can comprise a combination of computer-executable instructions and hardware.

Furthermore, the components 702-714 of the training manager 700 may, for example, be implemented as one or more stand-alone applications, as one or more modules of an application, as one or more plug-ins, as one or more library functions or functions that may be called by other applications, and/or as a cloud-computing model. Thus, the components 702-714 of the training manager 700 may be implemented as a stand-alone application, such as a desktop or mobile application. Furthermore, the components 702-714 of the training manager 700 may be implemented as one or more web-based applications hosted on a remote server. Alternatively, or additionally, the components of the training manager 700 may be implemented in a suite of mobile device applications or "apps." To illustrate, the components of the training manager 700 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

As shown, the training manager 700 can be implemented as a single system. In other embodiments, the training manager 700 can be implemented in whole, or in part, across multiple systems. For example, one or more functions of the training manager 700 can be performed by one or more servers, and one or more functions of the training manager 700 can be performed by one or more client devices. The one or more servers and/or one or more client devices may generate, store, receive, and transmit any type of data used by the training manager 700, as described herein.

In one implementation, the one or more client devices can include or implement at least a portion of the training manager 700. In other implementations, the one or more servers can include or implement at least a portion of the training manager 700. For instance, the training manager

700 can include an application running on the one or more servers or a portion of the training manager 700 can be downloaded from the one or more servers. Additionally or alternatively, the training manager 700 can include a web hosting application that allows the client device(s) to interact with content hosted at the one or more server(s).

For example, upon a client device accessing a webpage or other web application hosted at the one or more servers, in one or more embodiments, the one or more servers can initiate the training manager 700 stored at the one or more servers. Specifically, the client device can generate a request (i.e., via user input) to initiate the training system. Upon receiving the request, the one or more servers can automatically perform the methods and processes described above to train a representation system (including an audio encoder and a video encoder). The one or more servers can train the representation and display updates (e.g., status, errors, etc.) to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 9. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks 'M08 will be discussed in more detail below with regard to FIG. 9.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 9.

FIGS. 1-7, the corresponding text, and the examples, provide a number of different systems and devices that allows a user to train a system to generate robust representations of audio and video. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of generating audio and video representations using self-supervised learning, in accordance with one or more embodiments. In one or more embodiments, the method 800 is performed in a digital medium environment that includes the training manager 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving a video signal including an audio component and a video component. While a video signal is described, it should be appreciated that any signal including audio components and video components may be received by the training system.

As illustrated in FIG. 8, the method 800 includes an act 804 of training a first machine learning model to determine a representation of the audio component using a contrastive learning task and a temporal learning task. The first machine learning model may be an audio encoder. Generally, encoders determine a latent space representation of an input. The audio encoder is used to determine an audio feature vector using the audio signal. Specifically, the audio encoder is trained to generate an audio feature vector using a multi-headed architecture. Various heads of the audio encoder are trained to perform temporal pretext tasks, and various heads of the audio encoder are trained to perform contrastive learning tasks. By training the audio encoder using both temporal pretext tasks and contrastive learning, the audio encoder learns short term features, long term features, and semantic information about audio signals. In this manner, the audio encoder is able to generate a robust audio feature vector of the audio signal.

As illustrated in FIG. 8, the method 800 includes an act 806 of training a second machine learning model to determine a representation of the video component using the contrastive learning task and the temporal learning task. The second machine learning model may be a video encoder. The video encoder is used to determine a video feature vector using the video signal. Specifically, the video encoder is trained to generate a video feature vector using a multi-headed architecture. Various heads of the video encoder are trained to perform temporal pretext tasks, and various heads of the video encoder are trained to perform contrastive learning tasks. By training the video encoder using both temporal pretext tasks and contrastive learning, the video encoder learns short term features, long term features, and semantic information about video signals. In this manner, the video encoder is able to generate a robust video feature vector of the video signal.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
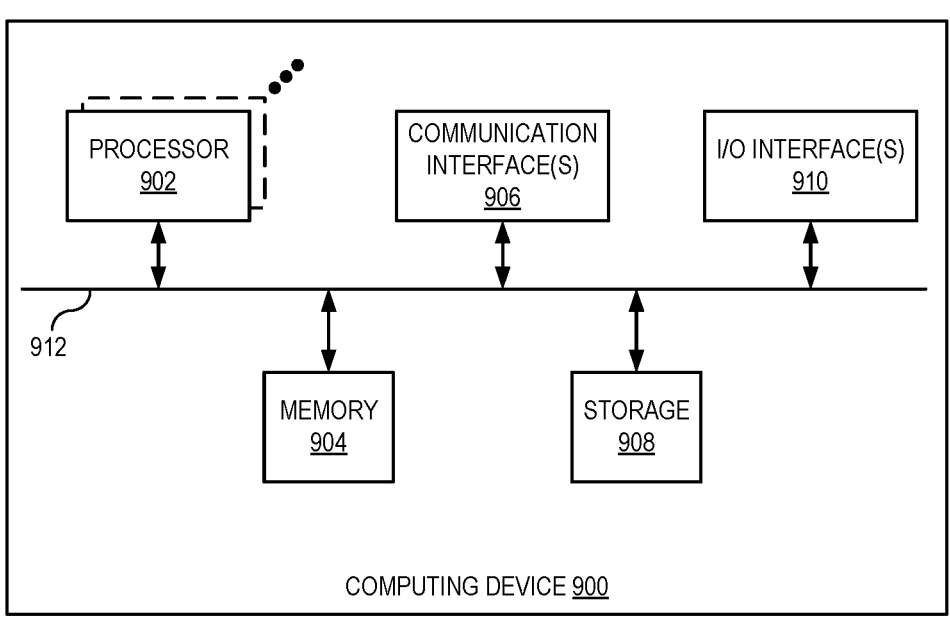
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the training system. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/ interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a video signal including an audio component and a video component;
   training a first machine learning model to determine a representation of the audio component using a first loss comprising a combination of a first contrastive learning loss based on a contrastive learning task executed by a first head of the first machine learning model and first temporal loss based on a temporal learning task executed by a plurality of heads of the first machine learning model, wherein one head of the plurality of heads of the first machine learning model captures short-term features using a single segment of the audio component and another head of the plurality of heads of the first machine learning model captures long-term features using a plurality of segments of the audio component; and
   training a second machine learning model to determine a representation of the video component using a second loss comprising a combination of a second contrastive learning loss based on the contrastive learning task executed by a first head of the second machine learning model and second temporal loss based on the temporal learning task executed by a plurality of heads of the second machine learning model, wherein one head of the plurality of heads of the second machine learning model captures short-term features using a single segment of the video component and another head of the plurality of heads of the second machine learning model captures long-term features using a plurality of segments of the video component.

2. The method of claim 1, wherein the representation of the audio component is an audio feature vector and the representation of the video component is a video feature vector, further comprising:
   receiving a set of prior feature vectors; and
   determining a similarity between a current feature vector and the set of prior feature vectors.

3. The method of claim 2, further comprising:
   determining a set of positive pairs for the contrastive learning task based on the similarity between the current feature vector and the set of prior feature vectors, wherein the set of positive pairs is determined using an augmented feature vector and one or more nearest neighbors to the augmented feature vector from the set of prior feature vectors.

4. The method of claim 3, further comprising:
   weighing each positive pair of the set of positive pairs according to a similarity between the current feature vector and each nearest neighbor of the one or more nearest neighbors.

5. The method of claim 2, further comprising:
   determining a set of negative pairs for the contrastive learning task based on the similarity between the current feature vector and the set of prior feature vectors, wherein the set of negative pairs is determined using an augmented feature vector and one or more nearest neighbors of the set of prior feature vectors a distance away from the augmented feature vector.

6. The method of claim 1, wherein:
training the first machine learning model using the contrastive learning task includes performing contrastive learning using temporally aligned inter-modal pairs; and
training the second machine learning model using the contrastive learning task includes performing contrastive learning using temporally aligned inter-modal pairs.

7. The method of claim 6, wherein:
training the first machine learning model using the contrastive learning task further includes performing contrastive learning using intra-modal pairs; and
training the second machine learning model using the contrastive learning task further includes performing contrastive learning using intra-modal pairs.

8. The method of claim 1, wherein the temporal learning task includes a playback speed classification task, a playback direction classification task, and a temporal clip ordering classification task.

9. The method of claim 8, wherein the playback speed classification task and the playback direction classification task are each performed by a unitary classifier, and the temporal clip ordering classification task is performed by a pairwise classifier.

10. The method of claim 9, wherein the unitary classifier learns intra-modal classification.

11. The method of claim 9, wherein the pairwise classifier learns both intra-modal and inter-modal classification.

12. A system comprising:
a memory component; and
a processing device coupled to the memory component, the processing device to perform operations comprising:
  receiving a video signal including an audio component and a video component;
  training a first machine learning model to determine a representation of the audio component using a first loss comprising a combination of a first contrastive learning loss based on a contrastive learning task executed by a first head of the first machine learning model and first temporal loss based on a temporal learning task executed by a plurality of heads of the first machine learning model, one head of the plurality of heads of the first machine learning model captures short-term features using a single segment of the audio component and another head of the plurality of heads of the first machine learning model captures long-term features using a plurality of segments of the audio component; and
  training a second machine learning model to determine a representation of the video component a second loss comprising a combination of a second contrastive learning loss based on using the contrastive learning task executed by a first head of the second machine learning model and second temporal loss based on the temporal learning task executed by a plurality of heads of the second machine learning model, wherein one head of the plurality of heads of the second machine learning model captures short-term features using a single segment of the video component and another head of the plurality of heads of the second machine learning model captures long-term features using a plurality of segments of the video component.

13. The system of claim 12, wherein the representation of the audio component is an audio feature vector and the representation of the video component is a video feature vector and wherein the processing device further performs operations comprising:
  receiving a set of prior feature vectors; and
  determining a similarity between a current feature vector and the set of prior feature vectors.

14. The system of claim 13, wherein the processing device further performs operations comprising:
  determining a set of positive pairs for the contrastive learning task based on the similarity between the current feature vector and the set of prior feature vectors, wherein the set of positive pairs is determined using an augmented feature vector and one or more nearest neighbors to the augmented feature vector from the set of prior feature vectors.

15. The system of claim 13, wherein the processing device further performs operations comprising:
  determining a set of negative pairs for the contrastive learning task based on the similarity between the current feature vector and the set of prior feature vectors, wherein the set of negative pairs is determined using an augmented feature vector and one or more nearest neighbors of the set of prior feature vectors a distance away from the augmented feature vector.

16. A non-transitory computer-readable medium storing executable instructions, which when executed by a processing device, cause the processing device to perform operations comprising:
  determining a first feature vector using a first machine learning model trained to determine the first feature vector using a first loss comprising a combination of a first contrastive learning loss based on a contrastive learning task executed by a first head of the first machine learning model and first temporal loss based on a temporal learning task executed by a plurality of heads of the first machine learning model, wherein one head of the plurality of heads of the first machine learning model captures short-term features and another head of the plurality of heads of the first machine learning model captures long-term features;
  providing the first feature vector to a processing module to perform a processing task; and
  outputting a result of the processing task.

17. The non-transitory computer-readable medium of claim 16, storing executable instructions that further cause the processing device to perform operations comprising:
  determining a second feature vector using a second machine learning model trained to determine the second feature vector using the contrastive learning task and the temporal learning task.

18. The non-transitory computer-readable medium of claim 17, storing executable instructions that further cause the processing device to perform operations comprising:
  providing the second feature vector to the processing module to perform the processing task.

19. The non-transitory computer-readable medium of claim 16, wherein the processing task is at least one of a video retrieval task, an action recognition task, a classification of video data, a tagging of video data, a searching of video data, video fingerprinting, an audio retrieval task, a classification of audio data, a tagging of audio data, a searching of audio data, or audio fingerprinting.

20. The non-transitory computer-readable medium of claim 16, wherein the first feature vector is either an audio feature vector or a video feature vector.

\* \* \* \* \*